Nov. 19, 1963 A. POLLMANN 3,111,197
LIFTING BEAM RETARDER FOR BRAKE BEAM SYSTEM
Filed Aug. 18, 1960 3 Sheets-Sheet 1
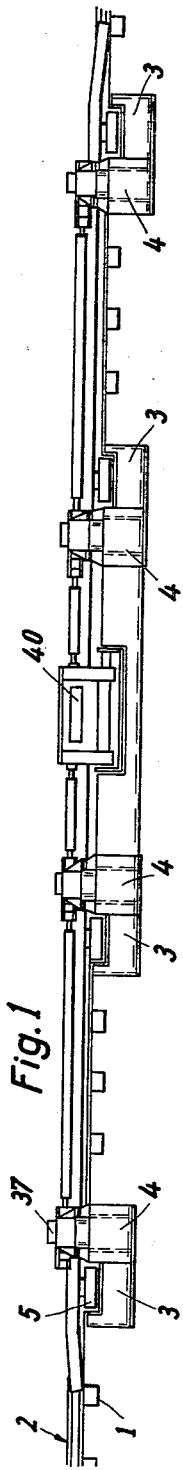
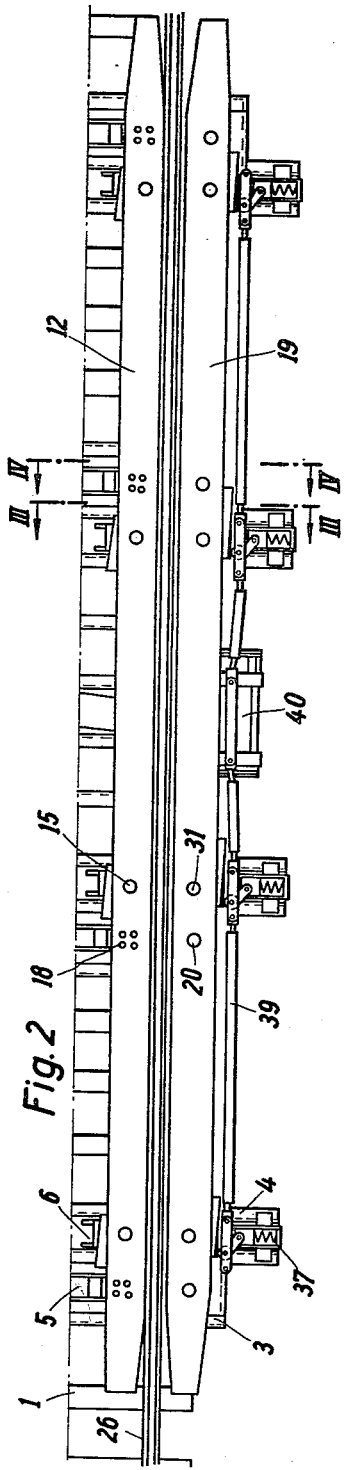
Inventor:

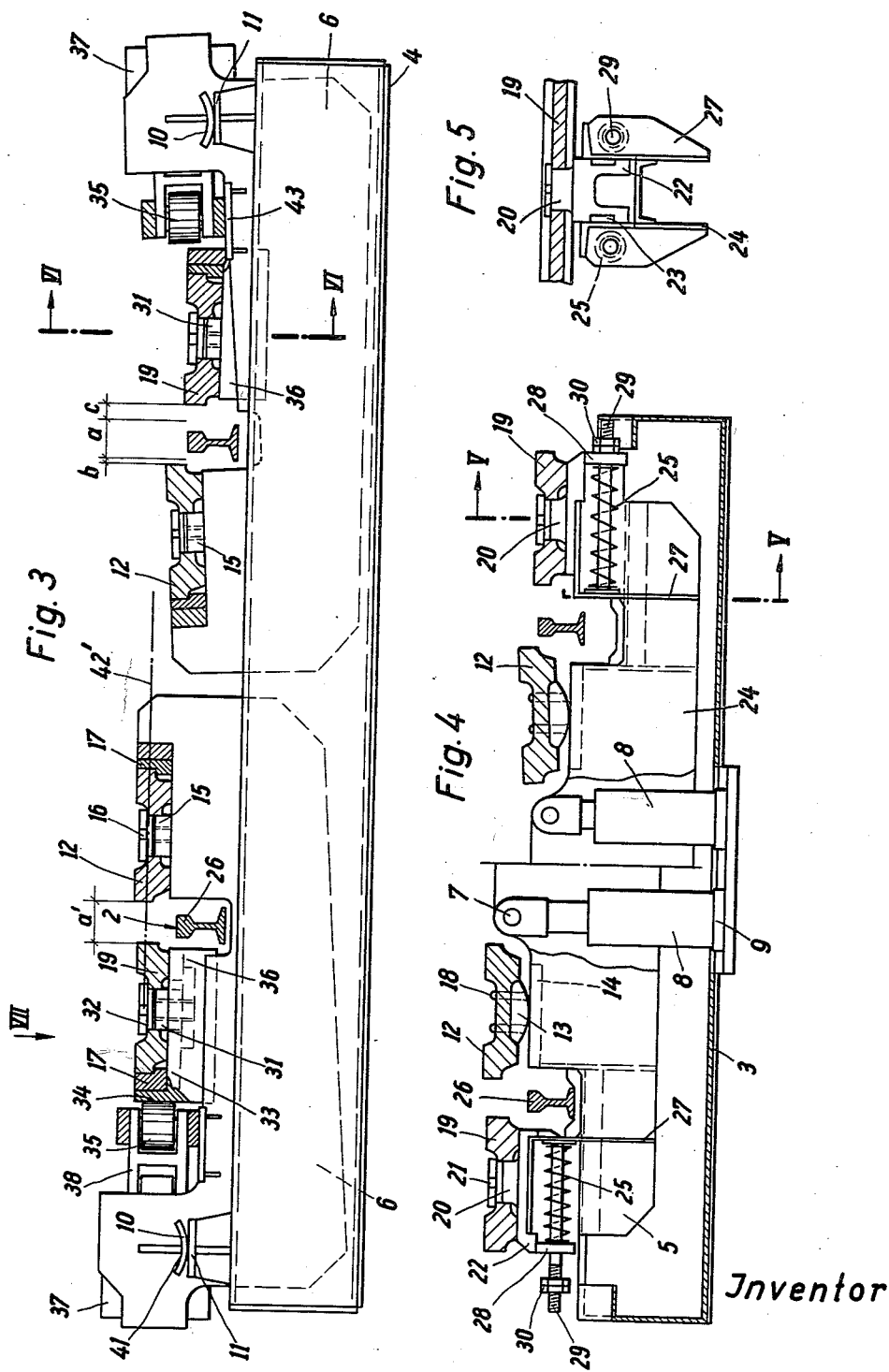

Inventor:

United States Patent Office 3,111,197
Patented Nov. 19, 1963

3,111,197
LIFTING BEAM RETARDER FOR BRAKE BEAM SYSTEM
Adolf Pollmann, Dinslaken, Germany, assignor to August Thyssen-Hutte Aktiengesellschaft, Duisburg-Hamborn, Germany
Filed Aug. 18, 1960, Ser. No. 50,546
7 Claims. (Cl. 188—62)

The present invention relates to a brake beam system or retarder for one or both rails of a line of railroad track.

More particularly, the present invention relates to a brake beam system in which the lower edge of the open space profile of the engine is situated on a lower level than the lower edge of the open space profile of the cars. Such well known brake beam systems can be lifted. The lifted position is the brake stand-by position and the braking position. The lowered position is the brake release position for the locomotive. The well known systems have a pair of non-adjustable brake beams normally situated inside the track and a pair of brake beams outside the track adjustable in the transverse direction. The devices for adjustment are rollers which are resiliently supported by positive connection stirrups with a centrally actuated adjustment linkage or the like. A separate stirrup is provided for each adjustable cross-section. The invention has for its object to provide a brake beam system wherein the power lifting and the power brake system are developed in a particularly advantageous manner.

Accordingly, it is an object of the present invention to provide a cross-piece and a stirrup positioned adjacent to each other with the interior brake beam coupled to the stirrup and pivotally arranged on the cross piece, in order to suspend the stirrup from the interior brake beam thereby effectively placing it under a brake surface.

Another object of the invention is to provide a slide chair capable of horizontal movement on the cross-piece, with the slide chair being associated with the outer brake beam.

A further object is to provide a spring coupled to the cross-piece for imparting transverse movement to the slide chair.

According to the invention, a lifting cross-piece is provided adjacent to each stirrup. On the cross-piece the interior brake beam is mounted pivotally. The stirrup is a one-armed lever attached to the interior brake beam, situated on the outside of the rails and rotatingly attached below the surface of the braking.

In a preferred embodiment, the exterior brake beam can be attached on a slide chair guided horizontally on the lifting cross-piece and transversely to the traveling rail. It can also be attached on a contact piece by which the stirrup is guided in the space from the cross-piece. This procedure provides a good distribution of the forces, of the vertical forces only on the cross-piece and of the horizontal forces only on the stirrup.

Between the slide chair and the cross-piece there is provided a spring means limited by a tensioning screw in the stress-relieving path toward the adjusting device, preferably a pair of springs situated outside the lateral surfaces of the cross-piece. The spring means provides a reaction in the case of a unilateraly working adjusting device, as for instance on a pad-roller. The limitation of the spring expansion ensures a distance free of contacting between the slide chair and the adjusting device when driven back to the release position during the lowered condition of the brake.

Furthermore, it is suitable to arrange the pivotal bearing of the stirrup as a rolling claw. A rolling claw is cheap and reliable. It makes possible a negligble displacement relatively to the substructure for compensating movements, because the stirrup should bear only the braking force.

Other objects of this invention will appear in the following description and appended claims, reference being had to the accompanying drawings forming a part of this specification wherein like reference characters designate corresponding parts in the several views.

In the drawings:

FIG. 1 shows a lifting retarder with four pairs of stirrups in side view.

FIG. 2 shows one longitudinal half of the retarder of FIG. 1 in top plan view;

FIG. 3 shows the cross-section on line III—III of FIG. 2;

FIG. 4 shows the cross-section on line IV—IV of FIG. 2 (the left parts of FIGS. 3 and 4 show the retarder in the lifted position, i.e., in the brake stand-by position or the braking position; the right parts of the two figures show the lowered position of the retarder as the brake release position);

FIG. 5 shows the cross-section on line V—V of FIG 4;

Figure 6:
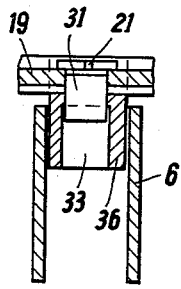
FIG. 6 shows the cross-section on line VI—VI of FIG. 3.

Referring now more particularly to FIGS. 1 and 2 of the drawings, a bed of sleepers or ties 1 carries a pair of rails generally designated 2 and one of which rails is designated by the reference numeral 26. Substructure frames 3 and 4 are provided to receive cross-piece 5 and stirrup 6. A separate substructure frame is provided for each of the cross-pieces and each of the stirrups. Each of the stirrups 6 includes a pack of rubber springs 37 positioned adjacent to an outer or exterior brake beam member 19. An actuating mechanism 39 is operatively coupled with the pack of rubber springs 37 and is activated by mechanism 40. This mechanism is composed by a cylinder, a piston movable in the cylinder, and a frame which is movable in a support. The cylinder is at a lower level than actuating mechanism 39. The piston is connected by rods to mechanism 39 which is axially moved in either direction thereby. The elements of mechanism 40 are conventional and are not illustrated in the drawing.

An inner or stationary brake beam 12 is provided, and brake beams 12 and 19 are positioned on opposite sides of rail 26. It is obvious that where more than one set of brake beams is provided, the other set can be positioned at the adjacent complementary rail of the line of railroad track. The outer brake beam 19 is coupled to a slide chair 22 which is slidable on cross-piece 5. The inner brake beam 12 is fixedly coupled by means of rivets 18 to a claw 13 (FIG. 4) and by means of pivot 15 to stirrups 6. By virtue of the pivots 15 the brake beam 12 is supported at each of the stirrups 6 and behaves as a "pin supported" beam. This allows adjustment of the beam if the pivots 15 are not exactly in a straight line.

In the area occupied by the retarder the bed of sleepers 1 for rails 2 is interrupted by the four tub-like substructure frames 3 and 4, i.e., the substructure frames 3 and 4 have the functions of the sleepers. The frames 3 each contain one cross-piece 5, the frames 4 each contain one pair of stirrups 6.

Referring now more particularly to FIG. 3 which shows two sets of stirrups 6 positioned with respect to a pair of rails 2, rail 26 being shown in the left portion of the drawing. Each stirrup 6 generally comprises a one-armed lever which is pivoted by means of a rolling claw 10 on to a chair 11 which is fixed to frame 4. Point 41 indicates the center of rotation of claw 10 on chair 11. Positioned behind the rolling claw is the pack of rubber springs 37. Stationary brake beam 12 is carried at the outer extremity of the one-armed lever or stirrup 6 and is fixed thereto by means of the pivot 15 and a screw 16. Movable brake beam 19 is positioned on the inner end of the one-armed lever and is carried by a pressing chair 33 (FIG. 6) coupled to the stirrup 6 and the brake beam 19 by means of the pivot 31 (FIG. 6) and a screw 32. The pivots 31 provide a connection between the stirrups 6 and the brake beam 19 which is similar to the connection furnished between the stirrups and the brake beam 12.

The one-armed lever is generally U-shaped and a pair of regulating wedges 17 is positioned between one leg of the U and the inner brake beam 12 and the other leg of the U and the outer brake beam 19. In the braking position which is shown at the left portion of the drawing of FIG. 3, both brake beams 12 and 19 are above a braking surface 42. The spacing between the two brake beams transversely of the rail 26 is designated as "$a$" and will be further described hereinafter.

An adjusting roller 35 is coupled to the stirrup 6 and engages a pressure surface 34, the adjusting roller 35 being carried by a slide table 42.

Referring now more particularly to FIG. 4 of the drawings, which shows cross-piece 5 and two pairs of stationary and movable brake beams 12, 19, respectively, cross-piece 5 is horizontally immovable in relation to the rails and it is pivoted to eyes 7 and supported on two slightly spaced cylinders 8 having bases 9 secured on the frame 3. The cross-piece has spaced side surfaces 24 (FIG. 5) between which are disposed both cylinders 8 associated with each cross piece. The eyes 7 extend transversely of the side surfaces 24 and are pivotally connected thereto. The eyes 7 are formed on pistons which are movable in a vertical direction in cylinders 8.

Constructionally, the positioning of the cross-piece 5 and the support of the brake beam during movement of brake beam 12 is the following.

The brake beams are supported on the cross-piece 5 which is raised and lowered through the two cylinders 8. Since the inner brake beams 12 are rigidly attached to the stirrup 6 and as the stirrups, when being lifted and lowered, have a rotational movement around the rolling claws 10, the inner brake beam 12 assumes a diagonal position in the lowered state, as shown in FIG. 4 on the right. This diagonal position cannot be assumed if the brake beam is fixedly attached to the cross-piece 5, but only if it is hinged thereto to allow for the tilting, such as through rolling claw 13 on chair 14 of cross-piece 5.

The exterior brake beam 19 being movable relatively to the stirrup 6 is attached on a slide chair 22 by the pivot 20 and by a screw 21. The slide chair 22 rests, as shown in FIG. 5, on a pair of guide rails 23 which is attached on the lateral surfaces 24 of cross-piece 5. Externally and parallel to the surfaces 24 are adjusting springs 25 whose ends adjacent to the rail 26 are supported by a web 27 of the cross-piece 5; the other end presses against a web 28 of the slide chair 22. Tension pins 29 extend through the springs and are attached to the web 27; these tension pins penetrate the web 28 with sliding play and have a pair of nuts 30 on the outside.

In the vicinity of the stirrup, the pressing chair 33 is attached on the beam 19 by the pivot 31 and by the screw 32; regulating wedge 17 is placed between the pressure surface 34 corresponding with the adjusting roller 35 and the beam 19. The wedge is movable longitudinally along the rails to compensate for wear of the brake beams. The pressing chair 33, which is similar to the slide chair 22, has sides 36 (FIG. 6). The sides 36 are not guided by rails as is slide chair 22, but rather sides 36 are unsupported by the sides of the stirrup 6 and the pressing chair 33 is thereby made freely slidable within the stirrup 6. Stirrup 6 is thus freely pivotable about chair 11 without interference from pressing chair 33 and brake 19 connected thereto.

The pack of rubber springs 37 supports the roller 35 by means of a swinging lever 38. 42 is a slide table for the apparatus connected to the adjusting roller 35. 39 is the mechanism for actuating and stopping the swinging lever 38. The swinging lever 38 is attached to the carriage 44 of the pack of rubber springs 37 at 43, 45 is the yoke of stirrup 6 which transfers the braking power to the stirrup 6. None of the elements mentioned in this paragraph forms part of the invention.

*Operation*

In the retarder position of the brake release for the locomotive (FIGS. 3 and 4 on the right), there is a "pass" groove between the brake beams 12 and 19 of the breadth $a+b+c$. $a$ is the thickness of the wheel running through, $b$ the free distance of one brake edge to the flange of the wheel, and $c$ the free distance of the other brake edge to the outer edge of the wheel. Brake beam 12 fixed to stirrup 6 has an inclined position. Stirrup 6 bears at one end on a chair 11 of the frame 4 with the rolling claw 10 and at the other end is supported from the interior brake beam 12. The exterior brake beam 19 is not supported by the stirrup but is supported by the cross-piece 5 together with the slide chair 22 fixed on it. The interior brake beam 12 is also supported on cross-piece 5 by the rolling claw 13, and brake beam 12 transfers the weight of the free end of stirrup 6 onto the cross-piece 5. The adjusting roller 35 is pushed back in the brake release position by the effect of mechanism 40 on mechanism 39 which in turn actuates swinging lever 38 so that it has no contact with the pressure surface 34 of the pressing chair 33. The pressing chair 33 is pushed by spring 25 in the exterior position which is determined by the adjusting of the nuts 30.

For lifting of the retarder, i.e., for the transition from brake release to stand-by, the pistons of cylinders 8 are extended. By this procedure the cross-piece 5 is lifted to the position of FIG. 4 on the left. The cross-piece 5 lifts the stirrup 6 also by means of the interior brake beam 12 to the position shown in FIG. 3, left side. During this action before any actuation of the adjusting roller 35, the "pass" groove was reduced by the dimension $b$ to the dimension $a+c$. This is caused by the position of the center of rotation 41 which is situated on the outside of the track and under the brake surface level 42'. Dimension $b$ is a radial component of the swinging movement around point 41 and prevents the brake beam 12 from contacting the flanges of the passing wheel in the "pass" position of standing.

If the adjusting roller 35 is rotated by mechanism 39, 38 into the working position for the transition from the position of stand-by to the braking position, the pressing chair 33 and together with it the exterior brake beam 19 are pushed toward the track rail 26 against the return force of spring 25 and the "pass" groove is reduced by the dimension $c$, so that the groove has only the dimension $a$. This is the boundary position of the retarder or the position of smallest retarding force. The position of the apparatus 39 in FIG. 2 corresponds to this condition.

Figure 7:
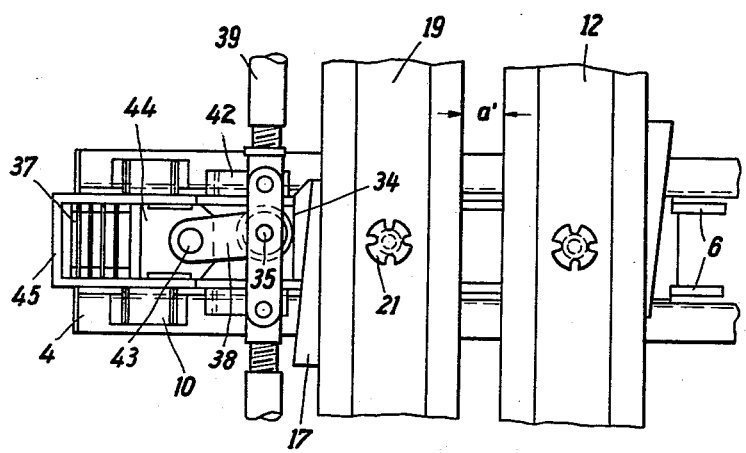
FIG. 7 is an enlarged view of a portion of the retarder of FIG. 2 designated by VII.

The groove $a'$ is smaller than the breadth $a$ of the wheel in the position of the brake beam shown in FIGS. 3 and 4 on the left and FIG. 7. The dimensions $a'$ and $a$ are not true to scale in the drawing. In this condition the roller 35 occupies the position shown in FIG. 7, and the swinging lever 38 in this position of the biggest possible braking force is almost in alignment with the longitudinal axis of stirrup 6.

A car coming from a hump and arriving at the retarder engages the groove $a$ with its wheels and so produces a retarding force. The exterior brake beam 19 is displaced outwardly against the action of the rubber pack 37. The mechanism 39 maintains lever 38 in its position corresponding to groove $a$. The stirrup 6 undergoes a small compensating displacement on the slide chairs 11 during the enlargement of groove $a'$.

During retarding roller 35 does not move; there is sliding movement of the pressure surface 34 on the roller 35, because of the rectilinear displacement of slide chair 22 in the direction of rubber pack 37. Thus the most stressed point of the retarder does not suffer a relative movement of its two parts during retarding. Vertical forces exerted by the wheel during retarding on the brake beam 19 are guided torque-free to the guide rails 23, because the guide rails extend practically under the braking edge of the beams 19. The longitudinal forces of all beams are taken up in the well known manner by a special armature body (not shown) and allowed to escape in a strong substructure of the track.

When the car has passed the retarder the groove is reduced from the dimension $a'$ to the dimension $a$ by relaxation of the rubber pack 37. Spring 25 provides a permanent force ensuring contact between roller 35 and pressure surface 34.

Before the retarder is lowered the mechanisms 39, 38 are first driven back to the released position (FIG. 3 on the right) by mechanism 40. The front wall 28 of the slide chair 22 contacts again the pair of nuts 30. When the roller 35 is free of contact, the pressure is released from cylinders 8 by an electrically actuated valve (not shown) so that cross-piece 5 and thereby stirrup 6 and the beams return into the brake release position for the locomotive (FIGS. 3 and 4 on the right).

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. A brake system adapted for engaging the wheels of a vehicle traversing a rail for retarding the vehicle, said system comprising a pair of brake beams positioned on opposite sides of the rail, a stirrup extending transversely of the rail, means securing one of said brake beams to said stirrup, a cross-piece extending transversely of said rail and adjacent the stirrup, means tiltably supporting said one brake beam on said crosspiece means tiltably supporting said stirrup with respect to said rail on a side thereof opposite that of said one brake beam, and means for elevating the crosspiece relative to the stirrup to cause tilting of said one brake beam and said stirrup therewith, means slidably supporting said other brake beam on said crosspiece for movement transverse to said rail, and means for sliding the other brake beam on said crosspiece in a direction transverse of said rail.

2. In a brake beam system for a rail of a line of railroad track having a pair of brake beams positioned on opposite sides of the rail, the provision of a stirrup, a cross piece adjacent said stirrup, means tiltably supporting one of the brake beams on said cross piece, means securing the latter brake beam on said stirrup at locations adjacent said means which tiltably supports the brake beam whereby the cross piece in part supports the stirrup through the latter brake beam, means supporting the other of the brake beams for sliding movement relative to said stirrup and cross piece in a direction transverse of said rail, means supporting said stirrup for pivotal movement about a point spaced from said rail such that pivotal movement of said stirrup causes transverse movement of said one brake beam relative to said rail, means for sliding said other brake beam relative to the stirrup and cross piece for causing movement of said other brake beam towards and away from said rail, and means for raising and lowering the crosspiece and the said one brake beam therewith for causing pivotal movement of the stirrup.

3. In a system as claimed in claim 2, in which said means supporting the other brake beam includes a slide chair fixedly coupled to the other brake beam and guide rails on said crosspiece extending transversely thereof, said slide chair riding on said guide rails for movement on said crosspiece transversely of the rail, a pressing chair slidably supported relative to said stirrup and a pivot coupling the other brake beam to said pressing chair.

4. In a system as claimed in claim 3 wherein the means for sliding the other brake beam includes a first web coupled to said slide chair and movable therewith, a second web fixed to said crosspiece and spring means positioned between said first and second webs effective to separate them and move the other brake beam to a brake release position, and means coupled to said stirrup for engagement with the other brake beam to overcome said spring means to move the other brake beam.

5. In a system as claimed in claim 2 in which said means supporting said stirrup for pivotal movement comprises a fixedly supported substructure frame, a chair fixed to said substructure frame, a rolling claw positioned at said location spaced from the rail and pivotally coupled to said chair for pivotal movement relative thereto and means fixedly coupling one end of said stirrup to said rolling claw.

6. In a system as claimed in claim 2 wherein said means for raising and lowering the crosspiece includes a fixedly supported cylinder, a piston in said cylinder and including an eye portion, said piston and cylinder being vertically positioned, and means coupling said crosspiece to the eye portion for movement of said crosspiece vertically in accordance with movement of the piston in said cylinder.

7. In a system as claimed in claim 2 wherein the means fixedly coupling the one brake beam on said stirrup comprises a pivot and a screw connecting said one brake beam and said stirrup; and an interposed regulating wedge positioned between said last-mentioned brake beam and said stirrup to permit adjustment of the one brake beam on the stirrup in a direction transverse of said rail.

References Cited in the file of this patent

UNITED STATES PATENTS

| | | |
|---|---|---|
| 1,906,349 | Wenzel | May 2, 1933 |
| 2,089,823 | Bone | Aug. 10, 1937 |
| 2,285,327 | Brown | June 2, 1942 |

FOREIGN PATENTS

| | | |
|---|---|---|
| 579,494 | Germany | June 27, 1933 |
| 945,153 | Germany | July 5, 1956 |
| 947,172 | Germany | Aug. 9, 1956 |
| 459,448 | Great Britain | Jan. 4, 1937 |